United States Patent [19]

Zachary

[11] 4,294,589
[45] Oct. 13, 1981

[54] METHOD FOR REMOVING TRAPPED GAS UNDER POND LINERS

[75] Inventor: Richard E. Zachary, Clinton, La.

[73] Assignee: The Dow Chemical Company, Midland, Mich.

[21] Appl. No.: 863,633

[22] Filed: Dec. 22, 1977

[51] Int. Cl.³ .............................................. B01D 53/00
[52] U.S. Cl. ...................................................... 55/36
[58] Field of Search ................... 55/36; 61/0.5, 7, 35, 61/36 B; 137/1, 205, 236, 571; 215/355

[56] References Cited

U.S. PATENT DOCUMENTS

| | | | |
|---|---|---|---|
| 3,256,908 | 6/1966 | Mann | 137/571 |
| 3,461,673 | 8/1969 | Slover | 61/7 X |
| 3,516,568 | 6/1970 | Fish | 61/0.5 X |
| 3,537,267 | 11/1970 | Webb | 61/0.5 |
| 4,068,480 | 1/1978 | Lefever et al. | 61/0.5 |

*Primary Examiner*—Robert H. Spitzer
*Attorney, Agent, or Firm*—A. J. Young

[57] ABSTRACT

A method for removing trapped gases such as air under a pond liner comprising partially filling the pond excavation under the liner with a liquid such as water thereby floating the liner on the liquid and collecting the trapped gases between the surface of the liquid and the liner, progressively filling the pond on top of the liner with another liquid such as water thereby forcing the trapped gases beneath the liner to the sides of the pond and venting the gases up the sides of the pond to the atmosphere, and draining away the liquid under the pond liner thereby settling the liner onto the bottom of the pond excavation.

5 Claims, No Drawings

METHOD FOR REMOVING TRAPPED GAS UNDER POND LINERS

BACKGROUND OF THE INVENTION

1. Field of the Invention

This invention relates to plastic lined ponds adapted for storing liquids such as waste water from industrial or municipal operations or fresh water and other liquids to be used in industrial or municipal operations, with particular reference to a method for removing trapped gases such as air under pond liners.

2. Description of the Prior Art

Storage ponds have long been used to hold large quantities of liquids such as fresh water or waste water for industrial and municipal operations. Storage ponds of this kind have also been lined with any suitable tough, thin material such as shells made from a synthetic resinous plastic material to avoid loss of a valuable raw material or contamination of ground water as a result of soil drainage from the ponds.

A problem that may occur when ponds are lined with plastic film or sheeting material is the formation of trapped gas or air bubbles under the liners when the ponds are filled with a liquid. Bubbles under pond liners are the result of trapping air under the liners during installation or gas formed by fermentation under the liner during use due to poor soil drainage conditions under the ponds. These trapped gas or air bubbles can cause severe damage to the plastic liners or liner seams to the extent that holes in the liners will virtually nullify use of the liners. The only known successful solution to the gas or air bubbles problem has been to cover the pond liners with gravel or soil. However, this solution is time consuming, costly and has hindered the location of leaks in the liners and subsequent repair of the leaks.

Accordingly, it is an object of the present invention to provide an inexpensive, fast method of eliminating gas or air bubbles under pond liners both during installation of the liners in ponds and during the service life of the liners. A further object of the present invention is to provide a method of removing gas or air bubbles under pond liners which will leave the liners reasonably unrestricted for location and repair of leaks in the liners during use of the ponds. Other objects of the present invention will be apparent from the following specification and claims.

Summary

In general, the present invention provides a method for removing or substantially eliminating trapped gases such as air under pond liners. The method comprises partially filling the pond excavation under the liner with a liquid such as water thereby floating the pond liner on the liquid and collecting the trapped gases between the surface of the liquid and the liner, progressively filling the pond on top of the liner with another liquid such as water thereby forcing the trapped gases beneath the liner to the sides of the pond and venting the gases up the sides of the pond to the atmosphere, and draining away the liquid under the pond liner thereby settling the liner onto the bottom of the pond excavation.

The present method may be used to remove trapped air bubbles under a pond liner during installation of the liner in a pond or may be used during operation of a lined pond to remove trapped fermentation gases under the liner by first substantially draining the pond before implementing the above steps of the method.

The liquid being used to progressively fill the pond on top of the liner may be introduced at any point in the pond, but is preferrably directed into the pond at about its lowest point to allow the wave action of the liquid to sweep the trapped gases uniformly to all sides of the pond. The liquid being introduced into the pond on top of the liner may be substantially the same as or different than the liquid introduced under the pond liner. Also, the liquid on top of the pond liner may be less dense than the liquid under the liner, but it is preferrably about equal to or greater in density than the liquid under the liner. If the liquid on top of the liner is less dense than the liquid under the liner, it may be necessary to physically aid in the movement of the trapped gas bubbles under the liner. In addition, the liquid under the liner may be drained away subsequent to the progressive filling of the pond on top of the liner or simultainously with the progressive filling of the pond on top of the liner provided, however, that all of the trapped gases are vented up the sides of the pond before the liquid under the liner is completely drained away.

DESCRIPTION OF THE PREFERRED EMBODIMENTS

The following description illustrates the manner in which the principles of the invention are applied but are not to be construed as limiting the scope of the invention.

More specifically, a pond used to hold a large quantity of saturated brine for an underground liquified petroleum gas storage installation was relined with a new liner. The pond was about 220 feet wide, 350 feet long and had a depth of about 15 feet with sloping sides. A chlorinated polyethylene sheeting of about 30 mils thick was placed in the pond with glued overlapping seams. Fresh water was then back pumped thru drainage tile under the pond to partially fill and float the formed liner in the pond thereby saturating the soil under the pond and trapping the air between the surface of the water and the underside of the liner. Saturated brine was then pumped through a sump about in the center of the pond at its deepest point to partially fill the pond on top of the liner. As the pond was progressively filled the saturated brine on top of the liner forced the liner to the bottom of the pond excavation and the trapped air to the sides of the pond where it was vented up the sides of the pond to the atmosphere. The water under the liner was drained away by pumping it away through the drainage tile under the pond. An inspection of the pond indicated that the liner had settled onto the bottom of the pond excavation and that the air trapped under the liner during installation had been substantially eliminated.

It is understood that the scope of this invention is not limited by size or shape of a lined pond, the material used to line a pond, the liquids introduced under or on top of a pond liner or the point at which the liquids are introduced into a pond. Thus, while certain representative embodiments and details have been shown for the purpose of illustrating the invention, it will be apparent to those skilled in the art that various changes and modifications can be made therein without departing from the spirit and the scope of the invention.

What is claimed is:

1. A method for removing trapped gases under a liner in a lined pond adapted for storing liquids comprising:

(a) partially filling the pond excavation under the liner with a liquid thereby floating the liner on the liquid and collecting the trapped gases between the surface of the liquid and liner;

(b) Progressively filling the pond of top of the liner with another liquid thereby forcing the trapped gases beneath the liner to the sides of the pond and venting the gases up the sides of the pond to the atmosphere; and (c) draining away the liquid under the liner thereby settling the liner onto the bottom of the pond excavation.

2. The method of claim 1 wherein the liquid being used to progressively fill the pond on top of the liner is directed into the pond at about its lowest point.

3. The method of claim 1 where in the liquid introduced into the pond on top of the liner is substantially the same as the liquid introduced into the pond excavation under the liner.

4. The method of claim 1 wherein the liquid introduced into the pond on top of the liner is different than the liquid introduced into the pond excavation under the liner.

5. The method of claim 1 wherein the liquid introduced on top of the liner has a density about equal to or greater then the density of the liquid introduced into the pond excavation under the pond liner.

* * * * *